US009463452B2

(12) United States Patent
Inoue et al.

(10) Patent No.: US 9,463,452 B2
(45) Date of Patent: Oct. 11, 2016

(54) HYDROTREATING CATALYST FOR HYDROCARBON OIL AND METHOD FOR PRODUCING SAME, AND HYDROCARBON OIL HYDROTREATING METHOD USING SAME (71) Applicant: CHIYODA CORPORATION, Yokohama-shi, Kanagawa (JP)

(72) Inventors: Shinichi Inoue, Yokohama (JP); Yukitaka Wada, Yokohama (JP); Akihiro Mutou, Zushi (JP); Takeo Ono, Kawasaki (JP)

(73) Assignee: CHIYODA CORPORATION, Yokohama-Shi (JP)

( * ) Notice: Subject to any disclaimer, the term of this patent is extended or adjusted under 35 U.S.C. 154(b) by 0 days.

(21) Appl. No.: 14/254,391

(22) Filed: Apr. 16, 2014

(65) Prior Publication Data
US 2014/0224708 A1 Aug. 14, 2014

Related U.S. Application Data (62) Division of application No. 13/581,997, filed as application No. PCT/JP2011/056708 on Mar. 22, 2011.

(30) Foreign Application Priority Data

Mar. 30, 2010 (JP) ................... 2010-077348

(51) Int. Cl.
*B01J 21/06* (2006.01)
*B01J 38/50* (2006.01)
(Continued)

(52) U.S. Cl.
CPC ................ *B01J 31/38* (2013.01); *B01J 21/04* (2013.01); *B01J 21/063* (2013.01); *B01J 23/88* (2013.01);
(Continued)

(58) Field of Classification Search
CPC .......... B01J 21/06; B01J 38/50; B01J 38/60; B01J 23/10; B01J 23/40
See application file for complete search history.

(56) References Cited

U.S. PATENT DOCUMENTS 7,956,000 B2 * 6/2011 Jansen ..................... B01J 23/85
502/20
2012/0190541 A1 * 7/2012 Chapamn et al. ...... B01J 21/063
502/439

FOREIGN PATENT DOCUMENTS

JP   5-96161 A    4/1993
JP   5-184921 A   7/1993
(Continued)

OTHER PUBLICATIONS

International Preliminary Report on Patentability and English translation of Written Opinion issued Nov. 22, 2012, in PCT International Application No. PCT/JP2011/056708.
(Continued)

*Primary Examiner* — Aileen B Felton
(74) *Attorney, Agent, or Firm* — Birch, Stewart, Kolasch & Birch, LLP (57) ABSTRACT A hydrotreating catalyst for hydrocarbon oil having a hydrodesulfurization activity additionally improved by: simultaneously and continuously adding an aqueous solution of an acidic compound containing titanium and an aqueous solution containing an alkaline compound to a hydrosol containing an alumina hydrate particle at a temperature of 10 to 100° C. and a pH of 4.5 to 6.5; washing the resultant to remove a contaminating ion; forming the washed product after dehydration so as to have a moisture content at which it is formable; drying the resultant; impregnating the dried product with a catalytic component aqueous solution containing periodic table group 6 metal compound, periodic table group 8-10 metal compound, phosphorus compound, and saccharide; and drying the resultant; a manufacturing method for the catalyst; and a hydrodesulfurization treatment method for hydrocarbon oil using the catalyst.

5 Claims, 4 Drawing Sheets

X-RAY DIFFRACTION PATTERN OF TITANIA-COATED ALUMINA SUPPORT AT-2

(51) Int. Cl.
- *B01J 31/38* (2006.01)
- *B01J 21/04* (2006.01)
- *B01J 23/883* (2006.01)
- *B01J 35/00* (2006.01)
- *B01J 35/10* (2006.01)
- *B01J 37/02* (2006.01)
- *C10G 45/08* (2006.01)
- *B01J 37/06* (2006.01)
- *B01J 23/88* (2006.01)
- *B01J 27/19* (2006.01)
- *B01J 23/882* (2006.01)

(52) U.S. Cl.
CPC ............... *B01J 23/883* (2013.01); *B01J 27/19* (2013.01); *B01J 35/002* (2013.01); *B01J 35/0026* (2013.01); *B01J 35/1019* (2013.01); *B01J 35/1038* (2013.01); *B01J 35/1047* (2013.01); *B01J 35/1061* (2013.01); *B01J 35/1085* (2013.01); *B01J 37/0207* (2013.01); *B01J 37/0221* (2013.01); *B01J 37/06* (2013.01); *C10G 45/08* (2013.01); *B01J 23/882* (2013.01); *B01J 35/0033* (2013.01); *B01J 37/0219* (2013.01)

(56) References Cited

FOREIGN PATENT DOCUMENTS

| | | |
|---|---|---|
| JP | 6-106061 A | 4/1994 |
| JP | 6-226108 A | 8/1994 |
| JP | 2001-276626 A | 10/2001 |
| JP | 2002-28485 A | 1/2002 |
| JP | 2004-33819 A | 2/2004 |

OTHER PUBLICATIONS

International Search Report, issued in PCT/JP2011/056708, dated Jul. 5, 2011.

Luo et al., "Titania-Alumina Composites," Mat. Res. Soc. Symp. Proc., vol. 346, 1994, Materials Research Society, pp. 445-450.

* cited by examiner

Fig. 1

X-RAY DIFFRACTION PATTERN OF TITANIA-COATED ALUMINA SUPPORT AT-2

Fig. 2

COMPARISON IN DIFFERENTIAL PORE DISTRIBUTION BETWEEN SUPPORTS AS-2 AND AT-2

Fig. 3

X-RAY DIFFRACTION PATTERN OF TITANIA-MIXED ALUMINA SUPPORT AT-14

Fig. 4

X-RAY ANALYSIS PATTERN OF TITANIA-COATED ALUMINA SUPPORT AT-13

HYDROTREATING CATALYST FOR HYDROCARBON OIL AND METHOD FOR PRODUCING SAME, AND HYDROCARBON OIL HYDROTREATING METHOD USING SAME

This application is a Divisional of co-pending U.S. application Ser. No. 13/581,997 filed Aug. 30, 2012, which is the National Phase of PCT/JP2011/056708, filed Mar. 22, 2011. This application also claims priority to Patent Application No. 2010-077348 filed in Japan on Mar. 30, 2010. All of the above applications are hereby expressly incorporated by reference into the present application.

TECHNICAL FIELD

The present invention relates to a hydrotreating catalyst for hydrocarbon oil effective as a hydrotreating catalyst for hydrocarbon oil such as a kerosene-gas oil fraction or the like, a manufacturing method therefor, and a hydrotreating method for hydrocarbon oil using the same.

BACKGROUND ART

At present, human beings are facing serious environmental destruction on a global scale. For example, sulfur oxide (SOx), nitrogen oxide (NOx), and particulates, which are generated by combustion of fossil fuel such as petroleum or coal, are released into the atmosphere to destruct a global environment remarkably. In particular, sulfur oxide causes acid rain, destructs an environment such as a forest or a lake, and makes a large influence on ecosystem.

The motor vehicle industry is extensively developing a technology for addressing exhaust gas, and is promoting research and development of novel technologies such as a combination of high-pressure injection and exhaust gas recirculation (EGR), homogeneous charge intelligent multiple injection, and an NOx catalyst. A concentration of sulfur in gas oil is decreased in order to alleviate influences on application of the EGR effective for a decrease in NOx and an aftertreatment apparatus for removing particulates.

This EGR is a technology for recirculating exhaust gas to decrease a concentration of oxygen in an engine and to make a combustion temperature lower, to thereby decrease production of NOx, and a cool EGR using an EGR cooler is more effective. Also in this technology, which has already been put into practical use in an gasoline engine, when a content of sulfur in a fuel is large, sulfur is accumulated as sulfuric acid in an engine and abrades engine parts such as a cylinder and a piston ring, and hence it is necessary to decrease a concentration of sulfur. Further, $SO_2$, which is produced by combustion of sulfur, serves as a poisoning substance for an oxidation catalyst for treating a soluble organic fraction (SOF: solvent soluble content) in particulates or a reduction catalyst for NOx. From this viewpoint as well, there is a demand for a decrease in concentration of sulfur in gas oil as fuel.

Constituents of the particulates are a sulfate derived from a sulfur compound in gas oil, soot (carbon; black smoke), and an SOF, and contents of the soot and the SOF are substantially the same. Gas oil subjected to deep desulfurization (sulfur concentration: 500 ppm) has substantially no sulfate content and is constituted only of the soot and the SOF. However, SOx, which is produced by combustion of sulfur, serves as a poisoning substance for the oxidation catalyst for treating the SOF or the reduction catalyst for NOx. From this viewpoint as well, there is a demand for an additional decrease in concentration of sulfur.

From such viewpoint, there is a particularly strict regulation on a content of sulfur in a petroleum fraction such as gasoline, kerosene-gas oil, or fuel oil, and there is a demand for development of a hydrotreating catalyst having an excellent activity of efficiently removing sulfur in a petroleum fraction.

A hydrodesulfurization catalyst for removing sulfur in a petroleum fraction, which is used industrially at present, is generally obtained by supporting molybdenum or tungsten and cobalt or nickel on a porous alumina support. It is known that a desulfurization activity of such hydrodesulfurization catalyst is remarkably affected by a supported state of a catalytic metal on a support. As a method involving improving the supported state to improve the activity of the hydrodesulfurization catalyst, there is known a hydrodesulfurization catalyst using a porous titania support, having a relative desulfurization activity increased by 2-fold or more as compared to a catalyst using an alumina support.

However, titania has drawbacks such as having a small specific surface area, having poor formability, and having low mechanical strength as compared to alumina. In addition, titania is high in raw material price and thus is economically disadvantageous as compared to alumina Hence, titania is seldom used industrially as the hydrodesulfurization catalyst.

Various studies have been made in order to overcome those drawbacks of the titania support. For example, Patent Literature 1 proposes a method involving increasing a specific surface area of titania and increasing a desulfurization activity. This method includes adding an anion or a cation as a particle growth inhibitor to a titanium hydrous oxide hydrosol or hydrogel manufactured by a pH swing method or a dried product thereof, and drying and calcining the mixture, thereby giving a high-performance hydrodesulfurization catalyst excellent in thermal stability, having a large specific surface area, containing a highly dispersed catalytic metal, having an improved catalytic activity, and having high mechanical strength. However, also in this method, such economic disadvantages that a titania raw material cost is high, and a mass of a catalyst to be filled per volume of a reactor becomes large because of a large compact bulk density of the catalyst have not been overcome yet.

In view of the foregoing, in order to provide a catalyst not only excellent in economic efficiency but also excellent in performance as a hydrodesulfurization catalyst (i.e., having high activity and excellent mechanical strength), various studies have been made on realizing the catalyst using a complex of alumina, which is low in raw material cost, and titania, which can be expected to exhibit high performance. For example, Patent Literature 2 discloses a technology according to a manufacturing method for a catalyst support for a hydrorefining treatment using a complex of an aluminum ion and a titanium ion formed by coprecipitation. Further, for example, Patent Literature 3 discloses a manufacturing method for an alumina/titania complex catalyst support involving adding a titanium hydroxycarboxylic acid salt and/or a titanium oxide or hydroxide sol and hydroxycarboxylic acid to aluminum oxide and/or hydroxide, and kneading and calcining the mixture.

However, in those technologies, improvements are found in terms of economic efficiency and catalytic strength by the addition of alumina, but in terms of catalytic activity, a content of titanium oxide decreases, and only performance depending on a mixing ratio between titanium oxide and alumina is exhibited.

As a method of overcoming such drawbacks, for example, Patent Literature 4 discloses a method involving introducing tetrachloride titanium gas into an alumina support to carry out chemical vapor deposition of titanium on a surface of alumina, thereby apparently coating a pore surface of the alumina support with titania. However, this method uses gaseous titanium tetrachloride. Hence, it is necessary to repeat the operation in order to increase an addition amount of titania, and there is a problem in terms of industrial productivity. In addition, owing to a reaction of $TiCl_4$ and $H_2O$, HCl gas is inevitably generated, and hence it is necessary to take countermeasures for corrosion of a manufacturing facility and environmental pollution as well into consideration.

Further, for example, Patent Literature 5 discloses a method involving impregnating an alumina support with a solution containing titanium to coat a pore surface of alumina with titanium. However, this method also has a problem in terms of industrial productivity because it is necessary to repeat an impregnation operation and a drying or calcination operation in order to increase an addition amount of titania. Further, the solution containing titanium is impregnated into pores of the alumina support, and hence physical properties such as a pore volume and a specific surface area of the alumina support inevitably deteriorate. Thus, it is difficult to improve performance of a hydrodesulfurization catalyst to a large extent.

Meanwhile, for example, Non Patent Literature 1 discloses a method involving providing a titania-alumina support by precipitation of titanium hydroxide on a surface of an alumina hydrate particle (coating), followed by aging, filtration, washing, forming, and calcination. However, the method according to the technology has a drawback in that an aggregate of titania is produced when an amount of titanium is more than 9.1% by weight, resulting in decreases in specific surface area and pore volume of alumina, although thermal stability and mechanical strength are improved.

The inventors of the present invention have already disclosed a catalyst manufacturing technology capable of manufacturing a catalyst which is excellent in specific surface area and mechanical strength and has a hydrodesulfurization catalyst activity comparable to that of a titania hydrodesulfurization catalyst based on such a phenomenon that an inorganic oxide and titanium oxide are chemically and microscopically integrated with each other even when titanium oxide is supported in an amount of 13% by mass or more by precipitating and stacking titanium oxide between both isoelectric points of the inorganic oxide and titanium oxide in supporting titanium oxide on a surface of the inorganic oxide (Patent Literature 6).

In addition, various studies have been made on an improvement in activity of a hydrotreating catalyst by using an organic compound in supporting a catalytic metal on a support.

For example, Patent Literature 7 discloses a manufacturing method for a hydrotreating catalyst involving impregnating an alumina support with a catalytic component-containing aqueous solution containing a catalytic metal, phosphoric acid, and additives including a dihydric or trihydric alcohol having 2 to 10 carbon atoms per molecule, an ether thereof, a monosaccharide, a disaccharide, and a polysaccharide, and drying the support at 200° C. or less.

Further, Patent Literature 8 discloses a manufacturing method for a hydrotreating catalyst having a catalytic metal supported on a support obtained by supporting an aqueous solution containing a titanium compound on an alumina hydrogel, followed by calcination. The "Detailed Deception of the Invention" section of the patent literature describes that a water-soluble organic compound is preferably added to a catalytic component-containing aqueous solution. In addition, the literature mentions, as the water-soluble organic compound, for example, a diol, an alcohol, an ether group-containing water-soluble polymer, a saccharide, and a polysaccharide each having a molecular weight of 100 or more and having a hydroxy group and/or an ether bond.

None of those two patent literatures discloses any organic compound particularly effective for a catalytic activity.

CITATION LIST

Patent Literature

[PTL 1] JP 2002-28485 A
[PTL 2] JP 05-96161 A
[PTL 3] JP 05-184921 A
[PTL 4] JP 06-106061 A
[PTL 5] JP 2001-276626 A
[PTL 6] JP 2004-33819 A
[PTL 7] JP 06-226108 A
[PTL 8] JP 2002-85975 A

Non Patent Literature

[NPL 1] Mat. Res. Soc. Symp. Proc. Vol. 346 445-450 1994

SUMMARY OF INVENTION

Technical Problem

An object of the present invention is to provide a manufacturing method for a hydrotreating catalyst for hydrocarbon oil using a titania-coated alumina support, the hydrotreating catalyst having an additionally improved hydrodesulfurization activity, a hydrotreating catalyst for hydrocarbon oil manufactured by the manufacturing method, and a hydrodesulfurization treatment method for hydrocarbon oil using the same.

Solution to Problem

The inventors of the present invention have found that the object of the present invention can be achieved through the use of a hydrotreating catalyst for hydrocarbon oil obtained by impregnating a titania-coated alumina support having physical properties improved by uniformly coating a surface of an alumina hydrate particle with titanium hydroxide under particular coating conditions with a periodic table group 6 metal compound, a periodic table group 8-10 metal compound, and a phosphorus compound as catalytic components and a particular saccharide, and drying the support. That is, the present invention is as described below.

<1> A manufacturing method for a hydrotreating catalyst for hydrocarbon oil, the method including:

a titania coating step including simultaneously and continuously adding an aqueous solution of an acidic compound containing titanium and an aqueous solution containing an alkaline compound to a hydrosol containing an alumina hydrate particle at a temperature ranging from 10 to 100° C. and a pH ranging from 4.5 to 6.5, and coating a surface of the alumina hydrate particle with a titanium hydroxide particle while keeping the pH constant to give a titania-coated alumina hydrate particle;

a washing step of washing the resultant titania-coated alumina hydrate particle to remove a contaminating ion which coexists with the particle;

a forming step of forming the washed titania-coated alumina hydrate particle after dehydrating the particle so as to have a moisture content at which the particle is formable;

a first drying step of drying a titania-coated alumina hydrate particle formed article obtained by the forming to give a titania-coated alumina support;

an impregnating step of impregnating the resultant titania-coated alumina support with a catalytic component-containing aqueous solution containing at least one kind of periodic table group 6 metal compound, at least one kind of periodic table group 8-10 metal compound, and at least one kind of phosphorus compound as catalytic components, and a saccharide (hereinafter, sometimes simply referred to as "catalytic component-containing aqueous solution"); and a second drying step of drying the titania-coated alumina support impregnated with the catalytic component-containing aqueous solution.

<2> A manufacturing method for a hydrotreating catalyst for hydrocarbon oil according to the above-mentioned item <1>, in which the saccharide to be used in the impregnating step includes at least one kind of saccharide selected from the group consisting of erythritol, arabinose, xylose, xylitol, ribose, fructose, sorbose, glucose, mannose, galactose, sorbitol, mannitol, invert sugar, dulcitol, sucrose, lactose, maltose, trehalose, maltitol, isomerized sugar, and raffinose.

<3> A manufacturing method for a hydrotreating catalyst for hydrocarbon oil according to the above-mentioned item <1>, in which the saccharide to be used in the impregnating step includes at least one kind of saccharide selected from the group consisting of erythritol, xylose, xylitol, sorbitol, mannitol, invert sugar, maltose, trehalose, maltitol, isomerized sugar, and raffinose.

<4> A manufacturing method for a hydrotreating catalyst according to any one of the above-mentioned items <1> to <3>, in which a crystal system of the alumina hydrate particle includes boehmite, pseudoboehmite, and/or an alumina gel.

<5> A manufacturing method for a hydrotreating catalyst according to any one of the above-mentioned items <1> to <4>, in which a pore sharpness degree of the alumina hydrate particle after calcination at 500° C. for 3 hours is 60% or more.

<6> A manufacturing method for a hydrotreating catalyst according to any one of the above-mentioned items <1> to <5>, in which a temperature condition of the titania coating step is a temperature ranging from 15 to 90° C.

<7> A manufacturing method for a hydrotreating catalyst for hydrocarbon oil according to any one of the above-mentioned items <1> to <6>, in which an operation of the titania coating step is carried out under the following conditions for (a) pH and (b) coating time:

(a) pH: within a pH variation range of ±0.5 with respect to a pH to be determined with the following equation (1):

$$pH = 6.0 - 0.03 \times T \quad \text{Equation (1)}$$

in the equation (1), T represents a ratio (mass %) of titania with respect to a whole of the titania-coated alumina hydrate particle (oxide basis); and (b) coating time: within a range of 5 minutes to 5 hours.

<8> A manufacturing method for a hydrotreating catalyst for hydrocarbon oil according to any one of the above-mentioned items <1> to <7>, in which an amount of titanium hydroxide with which the alumina hydrate particle is coated falls within a range of 5 to 40% by mass with respect to a total amount on an oxide basis.

<9> A manufacturing method for a hydrotreating catalyst for hydrocarbon oil according to any one of the above-mentioned items <1> to <8>, in which an aging time in the impregnating step falls within a range of 10 minutes to 24 hours.

<10> A manufacturing method for a hydrotreating catalyst for hydrocarbon oil according to any one of the above-mentioned items <1> to <9>, in which the periodic table group 6 metal to be used in the impregnating step includes molybdenum and the periodic table group 8-10 metal includes cobalt and/or nickel.

<11> A manufacturing method for a hydrotreating catalyst for hydrocarbon oil according to any one of the above-mentioned items <1> to <10>, in which an addition amount of the saccharide to be used in the impregnating step falls within a range of 1 to 20% by mass with respect to a total amount on an oxide basis of the support and the catalytic components.

<12> A hydrotreating catalyst for hydrocarbon oil, which is manufactured by the manufacturing method for a hydrotreating catalyst for hydrocarbon oil according to any one of the above-mentioned items <1> to <11>.

<13> A hydrotreating catalyst for hydrocarbon oil according to the above-mentioned item <12>, in which the catalyst has supported thereon a periodic table group 6 metal compound, a periodic table group 8-10 metal compound, a phosphorus compound, and a saccharide.

<14> A hydrotreating catalyst for hydrocarbon oil according to the above-mentioned item <12> or <13>, in which a repetition length of a crystal lattice plane of titania in the titania-coated alumina support is 50 Å or less.

<15> A hydrotreating catalyst for hydrocarbon oil according to any one of the above-mentioned items <12> to <14>, in which a pore sharpness degree of the titania-coated alumina support is 60% or more.

<16> A hydrotreating catalyst for hydrocarbon oil according to any one of the above-mentioned items <12> to <15>, in which a pore volume of the titania-coated alumina support is 0.36 to 1.10 ml/g.

<17> A hydrotreating catalyst for hydrocarbon oil according to any one of the above-mentioned items <12> to <16>, in which a specific surface area of the titania-coated alumina support is 200 m$^2$/g or more.

<18> A hydrotreating catalyst for hydrocarbon oil according to any one of the above-mentioned items <12> to <17>, in which a compact bulk density (CBD) of the catalyst is 0.5 to 1.1 g/ml.

<19> A hydrodesulfurization treatment method for hydrocarbon oil, including using a hydrotreating catalyst for hydrocarbon oil manufactured by the manufacturing method for a hydrotreating catalyst for hydrocarbon oil according to any one of the above-mentioned items <1> to <11>.

Advantageous Effects of Invention

According to the present invention, it is possible to provide the manufacturing method for a hydrotreating catalyst for hydrocarbon oil using a titania-coated alumina support having physical properties improved by uniform coating under particular coating conditions, the hydrotreating catalyst having an additionally improved hydrodesulfurization activity as compared to a conventional catalyst, the hydrotreating catalyst for hydrocarbon oil manufactured by the manufacturing method, and the hydrodesulfurization treatment method for hydrocarbon oil using the same. They can be effectively utilized in the hydrodesulfurization treatment of hydrocarbon oil, in particular, gas oil.

DESCRIPTION OF EMBODIMENTS

Hereinafter, the present invention is described in detail.
A: Manufacturing Method for Hydrotreating Catalyst for Hydrocarbon Oil A manufacturing method for a hydrotreating catalyst for hydrocarbon oil according to the present invention (hereinafter, sometimes simply referred to as "manufacturing method of the present invention") includes a titania coating step, a washing step, a forming step, a first drying step, an impregnating step, and a second drying step. Hereinafter, the steps are described in the order of the steps.

(Titania Coating Step)

In the present invention, the titania coating step is a step including simultaneously and continuously adding an aqueous solution of an acidic compound containing titanium and an aqueous solution containing an alkaline compound to a hydrosol containing an alumina hydrate particle at a temperature ranging from 10 to 100° C. and a pH ranging from 4.5 to 6.5, and coating a surface of the alumina hydrate particle with a titanium hydroxide particle while keeping the pH constant to give a titania-coated alumina hydrate particle.

A crystal system of the alumina hydrate particle in the hydrosol as one of the raw materials to be used in this step may be exemplified by boehmite, pseudoboehmite, and an alumina gel. Any of the crystal systems may be used, and a mixture of the crystal systems may also be used.

As for the alumina hydrate particle, the pore volume of the particle after calcination at 500° C. for 3 hours is preferably 0.36 to 1.10 ml/g. When the pore volume is less than 0.36 ml/g, a compact bulk density in supporting a catalytic metal becomes higher (e.g., more than 1.1 g/ml), which makes it difficult to fill the catalyst into the existing hydrodesulfurization facility in terms of filling weight. On the other hand, when the pore volume is more than 1.10 ml/g, even in the case of supporting a catalytic metal, a catalyst particle side crushing strength (SCS) becomes lower (e.g., less than 0.6 kg/mm on a diameter 1 mmϕ basis), which may make it impossible to keep a practical strength.

As for the alumina hydrate particle, the pore sharpness degree of the particle after calcination at 500° C. for 3 hours is preferably 60% or more, more preferably 70% or more.

Herein, the "pore sharpness degree" is a numerical value that defines the uniformity of a pore diameter. That is, a pore sharpness degree closer to 100% means that the pore diameter of a catalyst or a support is uniform and consistent. That is, a pore diameter (median diameter) at 50% of a pore volume is determined, a partial pore volume (PVM) present within a pore diameter range of ±5% with respect to a logarithmic value of the median diameter is then determined, and a pore sharpness degree is determined with the following equation from the partial pore volume (PVM) and the pore volume (PVT).

Pore sharpness degree (%)=(PVM/PVT)×100

The pore sharpness degree may be calculated with the equation from a cumulative pore distribution curve measured by a mercury intrusion method.

A preparation method for the alumina hydrate particle to be used is not particularly limited. However, the alumina hydrate particle is preferably synthesized by a pH swing method. When the alumina hydrate particle is synthesized by the pH swing method, the alumina hydrate particle having a homogeneous shape can be obtained, and alumina having a pore sharpness degree of 60% or more can be obtained.

It should be noted that the synthesis of the alumina hydrate particle by the pH swing method is described in detail, for example, in JP 56-120508 B and JP 57-44605 B.

A contaminating ion derived from an alumina compound as a raw material is present in a hydrosol containing the alumina hydrate particle manufactured by the pH swing method. The contaminating ion may or may not be removed by washing prior to the subsequent titanium hydroxide coating operation (operation of the titania coating step in the present invention).

The titania coating step includes adding an aqueous solution of an acidic compound containing titanium and an aqueous solution containing an alkaline compound to the alumina hydrate particle, and uniformly coating a surface of the alumina hydrate particle with a titanium hydroxide particle so that the titanium hydroxide particle is supported on the surface of the alumina hydrate particle to give a titania-coated alumina hydrate particle.

The "acidic compound containing titanium" (hereinafter, sometimes simply referred to as "titanium compound") is preferably titanium sulfate, titanyl sulfate, titanium chloride, titanium peroxide, titanium oxalate, titanium acetate, or the like.

An addition method for an aqueous solution of a titanium compound to an alumina hydrate particle includes simultaneously and continuously adding an aqueous solution of a titanium compound and an aqueous solution containing an alkaline compound to a hydrosol having dispersed therein an alumina hydrate particle under particular temperature and pH conditions.

The temperature condition at this time is a temperature ranging from 10 to 100° C. For example, when the alumina hydrate particle is manufactured and the aqueous solution of a titanium compound is subsequently added, the temperature condition is a temperature ranging from approximately 50 to 100° C., which varies depending on the temperature condition during the manufacture of the alumina hydrate particle. When the alumina hydrate particle is manufactured and stored and the temperature decreases, the temperature condition is a temperature ranging from approximately room temperature to 50° C. In this regard, however, the temperature condition is preferably a temperature ranging from 15 to 80° C.

Meanwhile, the pH condition at this time is a pH ranging from 4.5 to 6.5, and the aqueous solution of a titanium compound and the aqueous solution containing an alkaline compound are simultaneously and continuously added while the pH is kept constant. It should be noted that, when a large-capacity coating reactor is used, it is difficult to keep the pH exactly constant. Thus, the "keeping constant" as used herein refers to an act of controlling the pH to as close a value as possible to a pH value of interest, preferably an act of controlling the pH within a range of ±0.5 with respect to a pH value of interest.

A principle of the pH condition is described.

When an alumina hydrate particle is coated with a titanium hydroxide particle, the isoelectric point of the alumina hydrate particle coated with titanium hydroxide varies depending on the coating amount. Table 1 below shows isoelectric point measurement results depending on different coating amounts of titanium hydroxide.

TABLE 1

| Coating amount of titanium hydroxide particle (mass %) | Isoelectric point (pH) measurement results |
|---|---|
| 0 | 10.0 |
| 10 | 9.2 |
| 20 | 8.5 |
| 30 | 7.8 |
| 40 | 7.2 |
| 50 | 6.6 |
| 100 | 4.2 |

In Table 1 above, the coating amounts of titanium hydroxide are each expressed in terms of mass ratio (%) with respect to a total on an oxide basis of titanium hydroxide and the alumina hydrate particle, and 100% of the titanium hydroxide particle and 100% of the alumina hydrate particle represent a case of only the titanium hydroxide particle and a case of only the alumina hydrate particle, respectively. In the following description, the "coating amount of titanium hydroxide" similarly means a mass ratio (%) with respect to a total on an oxide basis of titanium hydroxide and the alumina hydrate particle.

It should be noted that the isoelectric point was measured by an electrophoretic light scattering method using an HLS-8000 type apparatus manufactured by Otsuka Electronics Co., Ltd. as a measurement apparatus. The isoelectric point was determined as follows: a pH at which a zeta potential was 0 was determined based on a relationship between the measured pH and zeta potential; and the pH was adopted as the isoelectric point.

In theory, the pH in the case of coating the surface of the alumina hydrate particle with the titanium hydroxide particle has only to fall within a range of values more than pH=4.2, which is an isoelectric point in 100% of the titanium hydroxide particle, and less than an isoelectric point corresponding to a concentration of each titanium hydroxide particle (coating amount of titanium hydroxide). For example, when the concentration of the titanium hydroxide particle is 10%, the pH is less than pH=9.2 (see Table 1).

However, the pH in the case of uniformly and strongly coating the surface of the alumina hydrate particle with titanium hydroxide preferably falls within a range of 4.5 to 6.5 as defined in the invention of the present application. The reason for this is as follows: the zeta potential of the titanium hydroxide particle is controlled to −5.0 mV or less (5.0 mV or more in terms of absolute value) by controlling the pH to 4.5 or more; the zeta potential of the titania-coated alumina hydrate particle is controlled to 20 mV or more (20 mV or more in terms of absolute value) by controlling the pH to 6.5 or less; and consequently, titanium hydroxide and the titania-coated alumina hydrate particle are constantly charged negatively and positively, respectively, and thus can be strongly bonded to each other. That is, the surface of the alumina hydrate particle is efficiently and strongly coated with titanium hydroxide through an attractive interaction based on a positive/negative relationship by controlling the pH within the range as defined in the invention of the present application.

The operation of the titania coating step is more preferably carried out under the following conditions for (a) pH and coating time:

(a) pH: within a pH variation range of ±0.5 with respect to a pH to be determined with the following equation (1):

$$pH = 6.0 - 0.03 \times T \quad \text{Equation (1)}$$

in the equation (1), T represents the coating amount of titanium hydroxide; and (b) coating time: within a range of 5 minutes to 5 hours.

When the operation of the titania coating step is carried out under the above-mentioned pH condition, a total of absolute values of the zeta potentials of the titanium hydroxide particle and the titania-coated alumina hydrate particle is effectively kept in the vicinity of the maximum value, and the surface of the alumina hydrate particle is more strongly coated with titanium hydroxide.

The equation (1) is a relational equation obtained by actually measuring relationships between the zeta potentials of the titanium hydroxide particle and the titania-coated alumina hydrate particle and the pH, and deriving a condition under which both the zeta potentials are effectively split in positive and negative ones through the use of the coating amount of titanium hydroxide as a variable.

Meanwhile, when the coating time of titanium hydroxide is less than 5 minutes, it is difficult to keep the pH exactly constant at a predetermined value in the case of using a large-capacity coating reactor, resulting in difficulty in uniformly and strongly coating the alumina hydroxide particle with titanium hydroxide. When the coating time is more than 5 hours, the manufacturing efficiency of titania-coated alumina hydrate decreases to a large extent. Accordingly, both the cases are not preferred.

Titanium hydroxide with which the surface of the alumina hydrate particle is coated under the conditions defined in the present invention is characterized by showing no crystal structure of anatase as titanium hydrate in analysis results by X-ray diffraction. The analysis results are described, in the first drying step, as the analysis results of a titania-coated alumina support obtained through the step.

In the present invention, the coating amount of the titanium hydroxide particle with which the surface of the alumina hydrate particle is coated falls within preferably a range of 5 to 40% by mass, more preferably a range of 10 to 35% by mass. When the coating amount is less than 5% by mass, an effect by addition of titanium hydroxide may not be sufficiently exhibited. When the coating amount is more than 40% by mass, particles of titanium hydroxide aggregate to each other, and hence the surface of the alumina hydroxide particle may not be uniformly coated with titanium hydroxide. Accordingly, both the cases are not preferred.

(Washing Step)

The reaction liquid after the titania-coated alumina hydrate particle has been obtained by coating the surface of the alumina hydrate particle with the titanium hydroxide particle generally contains contaminating ions such as a sodium ion or an ammonia ion as a cation and a sulfuric acid ion or a chlorine ion as an anion. Thus, the resultant titania-coated alumina hydrate particle is washed in this washing step. The washing allows the contaminating ions to be removed or reduced. The washing is carried out by a washing/filtration operation involving rinsing with water through the use of an Oliver filter, a press filter, or the like.

(Forming Step)

The titania-coated alumina hydrate particle obtained by the operation of the washing step is dehydrated so as to have a moisture content at which the particle is formable. The dehydration is generally carried out by an operation such as press filtration, vacuum filtration, or centrifugation filtration, and may be carried out by drying. In addition, the dehydration may be carried out by a combination of those operations.

After the dehydration, the particle is formed into a shape suitable for a use purpose, such as a columnar shape, a clover shape, a cylindrical shape, or a spherical shape to give a titania-coated alumina hydrate particle formed article.

(First Drying Step)

The first drying step is a step of stabilizing the titania-coated alumina hydrate particle formed article obtained in the forming step through an operation of drying or drying and the subsequent calcination. A temperature at which the drying or drying and the subsequent calcination is carried out falls within preferably a range of 100 to 600° C., more preferably a range of 120 to 500° C. When the treatment is carried out at a temperature of less than 100° C., the drying requires much time, which is not practical. Further, when the temperature is more than 600° C., a crystal form of anatase is observed and the coating with titanium hydroxide becomes non-uniform.

It should be noted that the operation of only the drying and the operation of the drying and the subsequent calcination are substantially the same except that the heating temperatures are different from each other, and hence the "drying" comprehends the concept of "calcination" in the present invention (the same holds true for the second drying step).

In this step, it is preferred that the drying time be appropriately selected from a range of 0.5 to 24 hours.

A titania-coated alumina support is obtained through the operation of this step.

In the operations of the steps described above, as a feature in the case of obtaining the titania-coated alumina support by coating with titanium hydroxide, there is a tendency that the specific surface area of a titanium hydroxide-supporting alumina particle becomes larger than the specific surface area of the alumina hydrate particle serving as a base. In addition, such a feature that the specific surface area does not decrease even when the total pore volume increases is also found. In the present invention, a hydrodesulfurization catalyst having a very high activity can be prepared while keeping the compact bulk density of the catalyst at an appropriate value (e.g., 1.1 g/ml or less) by making the most of those features.

Figure 1:
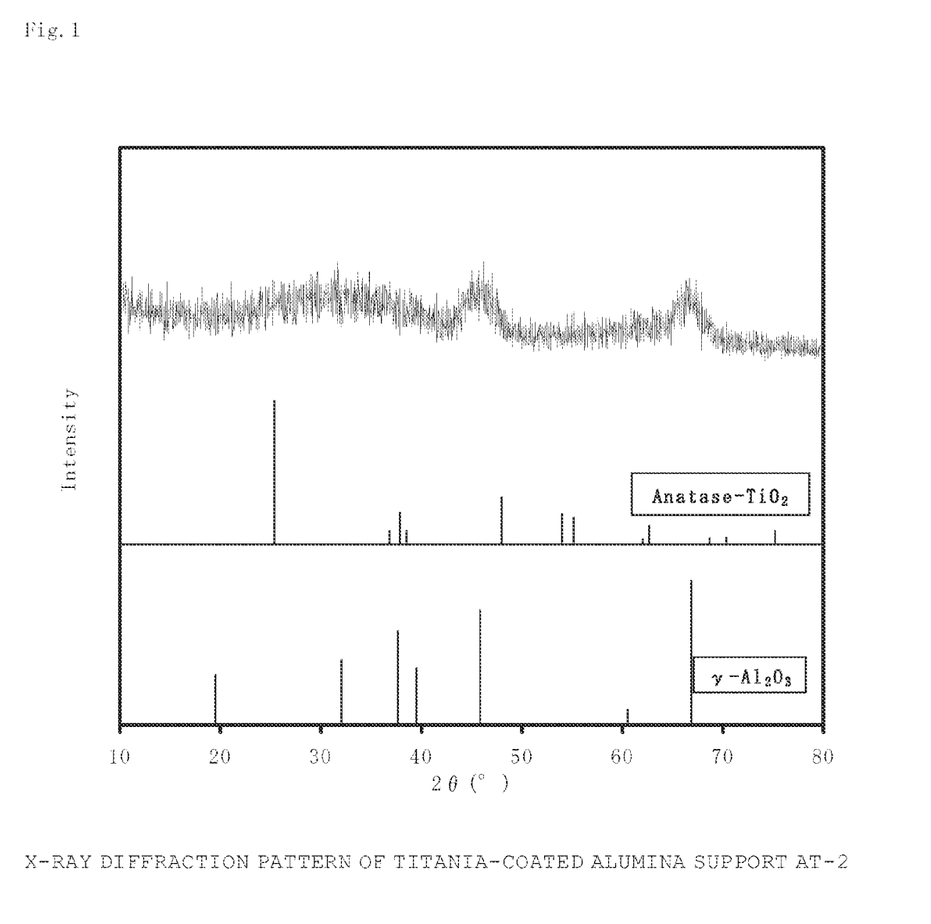
FIG. 1 A graph showing an X-ray diffraction pattern of a titania-coated alumina support AT-2 prepared under conditions of a support production step in the present invention.

As described above, titanium hydroxide with which the surface of alumina hydrate is coated under the conditions of the titania coating step in the present invention is characterized by showing no crystal structure of anatase as titanium hydrate in analysis results by X-ray diffraction.

A case where a main peak 2θ=26.5° of anatase is detected with a general X-ray diffraction apparatus suggests the presence of an aggregate of titanium hydrate, and it cannot be said that the coating has been carried out optimally. However, a case where this peak is not detected indicates that the surface of the alumina hydrate particle has been strongly and uniformly coated with titanium hydroxide, and suggests that the repetition length of the crystal lattice plane of titanium hydroxide is 50 Å or less.

FIG. 1 shows an example of an XRD measurement result (X-ray diffraction pattern) of titania-coated alumina produced under the conditions of the titania coating step in the present invention. This is specifically a measurement result of a titania-coated alumina AT-2 used in Examples to be described later.

Figure 4:
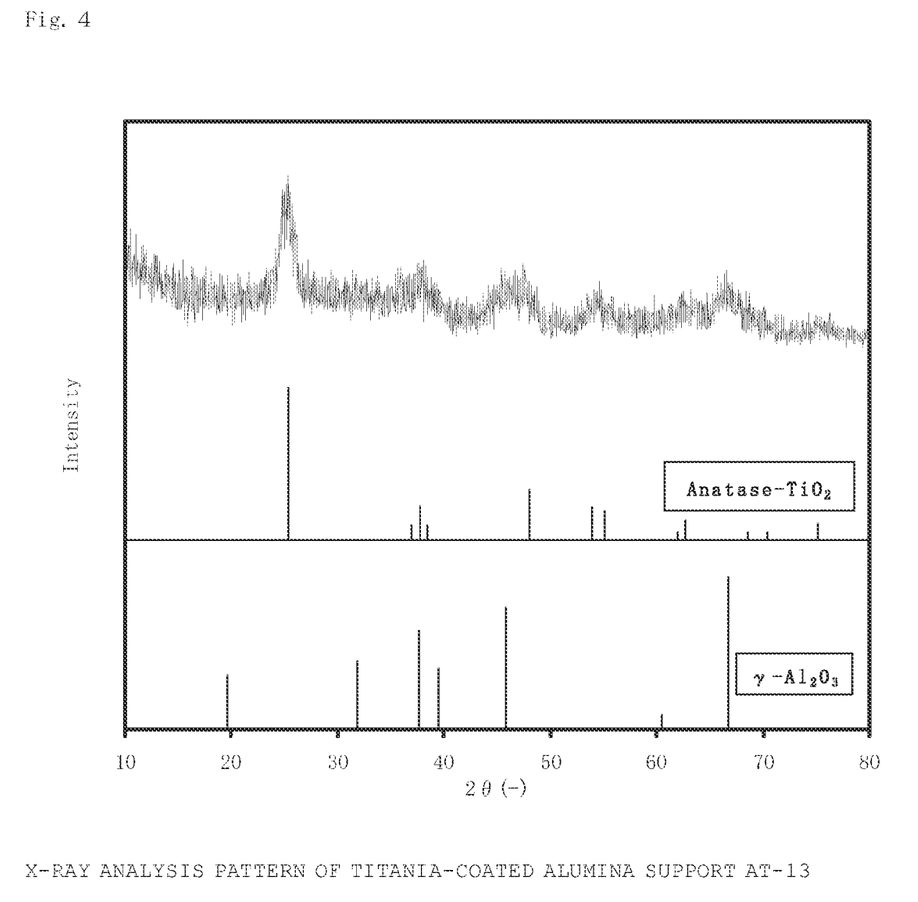
FIG. 4 A graph showing an X-ray diffraction pattern of a titania-coated alumina support AT-13 prepared under different conditions from those of the support production step in the present invention.

Meanwhile, it is highly probable that titanium hydroxide in the case of coating under different conditions from those defined in the present invention shows a crystal structure of anatase as titanium hydrate in analysis results by X-ray diffraction, and it is also highly probable that no strong coating is not carried out. For example, in the case of coating with 30% by mass on an oxide basis of titanium hydroxide while keeping the pH at 8.0, charges of titanium hydroxide and the titania-coated alumina hydrate particle are both negative and hence repel each other, with the result that no strong coating is carried out.

FIG. 4 shows an XRD pattern in this state. This is specifically a measurement result of a titania-coated alumina support AT-13 to be described later.

(Impregnating Step)

The impregnating step is a step of impregnating the titania-coated alumina support obtained in the first drying step with an aqueous solution containing catalytic components including at least one kind of periodic table group 6 metal compound and at least one kind of periodic table group 8-10 metal compound as catalytic metal compounds and at least one kind of phosphorus compound, and at least one kind of saccharide.

After the impregnation with the catalytic component-containing aqueous solution, aging is carried out as necessary in order to uniformly stabilize an active metal on the titania-coated alumina support. It should be noted that the "aging" refers to that the support is impregnated with the catalytic component-containing aqueous solution and then left to stand still in that state. In the present invention, this aging operation is also included in one of the operations of the "impregnating step." The aging time falls within preferably a range of 10 minutes to 24 hours.

Examples of the periodic table group 6 metal include molybdenum and tungsten. In particular, molybdenum is preferred. A preferred molybdenum compound is exemplified by molybdenum trioxide and ammonium p-molybdate. The loading of each of those periodic table group 6 metal compounds falls within preferably a range of 10 to 40% by mass, more preferably a range of 15 to 35% by mass with respect to the catalyst (total amount on an oxide basis of the support+the periodic table group 6 and 8-10 metal compounds+the phosphorus compound, the same applies hereinafter).

Examples of the periodic table group 8-10 metal include cobalt and nickel. A preferred nickel compound is exemplified by nickel nitrate and basic nickel carbonate, and a preferred cobalt compound is exemplified by cobalt nitrate and basic cobalt carbonate. Those cobalt compounds and nickel compounds may be used alone or in combination. The loading (addition amount) of each of those active metal compounds falls within preferably a range of 1 to 10% by mass, more preferably a range of 2 to 8% by mass with respect to the catalyst.

Examples of the phosphorus compound include phosphorus pentoxide and orthophosphoric acid. The loading (addition amount) of the phosphorus compound falls within a range of 1 to 10% by mass, preferably a range of 2 to 8% by mass with respect to the catalyst.

Examples of the saccharide include: monosaccharides such as trioses (glyceraldehyde, dihydroxyacetone, and glycerine), tetroses (such as erythrose, threose, erythrulose, and erythritol), pentoses (such as ribulose, xylulose, ribose, arabinose, xylose, xylitol, lyxose, and deoxyribose), hexoses (such as psicose, fructose, sorbose, tagatose, allose, altrose, glucose, mannose, gulose, idose, galactose, talose, fucose, fuculose, rhamnose, sorbitol, mannitol, dulcitol, galactitol, glucosamine, galactosamine, inositol, and invert sugar), and heptoses (such as sedoheptulose); disaccharides such as sucrose, lactose, maltose, trehalose, maltitol, turanose, cellobiose, gentiobiose, isomaltose, kojibiose, laminaribiose, melibiose, nigerose, and sophorose; trisaccharides such as raffinose, melezitose, and maltotriose; tetrasaccharides such as acarbose and stachyose; oligosaccharides such as fructo-oligosaccharide, galacto-oligosaccharide, and mannan-oligosaccharide; polysaccharides such as glycogen, starch, cellulose, dextrin, glucan, fructan, guar gum, and N-acetyl glucosamine; and isomerized sugar.

The saccharide in the present invention is preferably erythritol, arabinose, xylose, xylitol, ribose, fructose, sorbose, glucose, mannose, galactose, sorbitol, mannitol, invert sugar, dulcitol, sucrose, lactose, maltose, trehalose, maltitol, isomerized sugar, or raffinose. Those may be used alone or as a mixture of two or more kinds thereof Moreover, the saccharide in the present invention is particularly preferably erythritol, xylose, xylitol, a hexose such as sorbitol, mannitol, or invert sugar, maltose, trehalose, maltitol, isomerized sugar, or raffinose.

The addition amount of the saccharide falls within preferably a range of 1 to 20% by mass, more preferably a range of 5 to 15% by mass in terms of outer percentage with respect to the catalyst.

(Second Drying Step)

Next, the titania-coated alumina support impregnated with the catalytic component-containing aqueous solution in the impregnating step is dried in order to stabilize the catalytic components and the saccharide on the titania-coated alumina support. The drying temperature falls within preferably a range of 100 to 500° C. It is also possible to carry out heating continuously after the drying, i.e., calcination. The drying time falls within a range of 0.5 to 24 hours.

A hydrotreating catalyst for hydrocarbon oil exhibiting a high catalytic activity can be manufactured through the operations of the steps described above.

B: Hydrotreating Catalyst for Hydrocarbon Oil

The hydrotreating catalyst for hydrocarbon oil of the present invention (hereinafter, sometimes referred to as "hydrotreating catalyst of the present invention" or simply referred to as "catalyst of the present invention") is manufactured by the manufacturing method of the present invention as described above. With this, the catalyst of the present invention has supported thereon the periodic table group 6 metal compound, the periodic table group 8-10 metal compound, the phosphorus compound, and the saccharide.

The catalyst of the present invention, which is manufactured by the manufacturing method of the present invention, has a high pore sharpness degree, a large pore volume, and a large specific surface area, and provides an appropriate compact bulk density of the catalyst. Specifically, a hydrotreating catalyst having preferred physical properties shown below can be obtained.

The pore sharpness degree of the titania-coated alumina support contained in the catalyst of the present invention is preferably 60% or more, more preferably 70% or more. A pore sharpness degree of 60% or more is preferred because the activity of the catalyst increases owing to the presence of a large number of pores, which are optimum for a reaction, depending on the size of a reaction substance.

The pore volume of the titania-coated alumina support contained in the catalyst of the present invention is preferably 0.36 to 1.10 ml/g. A pore volume of 0.35 ml/g or more is preferred because it is easy to carry out the impregnation with the catalytic component-containing aqueous solution and it is also easy to control the compact bulk density (CBD) of the catalyst to 1.1 g/ml or less. On the other hand, a pore volume of more than 1.10 ml/g causes a decrease in catalyst particle side crushing strength (SCS), which may make it impossible to keep a practical strength.

The specific surface area of the titania-coated alumina support contained in the catalyst of the present invention is preferably 200 m$^2$/g or more. A specific surface area of 200 m$^2$/g or more can realize a hydrorefining catalyst exhibiting a high activity.

In this description, the specific surface area was measured by a BET three-point method. Macsorb Model-1201 manufactured by Mountech Co., Ltd. was used as a measurement instrument.

The compact bulk density (CBD) of the catalyst of the present invention falls within preferably a range 0.5 to 1.1 g/ml, more preferably a range of 0.5 to 1.0 g/ml. When the compact bulk density (CBD) is less than 0.5 g/ml, the catalyst particle side crushing strength (SCS) of the catalyst becomes lower (e.g., 0.6 kg/mm or less), with the result that the strength may fall short of a practical strength for the catalyst. Further, when the compact bulk density (CBD) is more than 1.1 g/ml, the filling into the existing desulfurization facility becomes difficult. Accordingly, both the cases are not preferred.

In the present invention, the compact bulk density (CBD) was measured as described below. First, a catalyst fractionated between 30 to 80 (mesh) through the use of a sieve is dried at 120° C. for 3 hours, then collected in an amount of about 30 (g), weighed precisely with an analytical balance, and filled into a measuring cylinder made of glass and having an inner diameter of 21 mm and a volume of 50 ml. Then, the measuring cylinder is tapped through the use of a vibrator to measure a volume at the minimum bulk. The compact bulk density (CBD) is determined by dividing a mass determined by precisely weighing the catalyst by the volume value at the minimum bulk.

C: Hydrodesulfurization Treatment Method for Hydrocarbon Oil

The hydrotreating method for hydrocarbon oil according to the present invention (hereinafter, sometimes simply referred to as "hydrotreating method of the present invention") includes using the catalyst of the present invention manufactured by the manufacturing method of the present invention described above.

When the hydrodesulfurization treatment is carried out through the use of the catalyst of the present invention, it is desired to carry out preliminary sulfurization for activating a catalytic metal. The preliminary sulfurization is carried out through the use of hydrogen sulfide, carbon disulfide, thiophene, dimethyl disulfide, hydrocarbon oil containing any of those compounds, or the like as a preliminary sulfurization agent.

After the preliminary desulfurization, a hydrodesulfurization treatment is carried out. A hydrodesulfurization condition varies depending on the kind of raw material oil and a purpose. In general, however, it is preferred that a reaction temperature fall within a range of 300 to 400° C. and a hydrogen partial pressure fall within a range of 1 to 10 MPa.

A reaction mode in the hydrodesulfurization treatment is not particularly limited and is exemplified by a fixed bed, a moving bed, an ebullating bed, and a suspension bed, any of which may be adopted. A reaction condition in the case where the fixed bed is adopted is preferably as follows: liquid hourly space velocity (LHSV) ranging from 0.5 to 5 hr$^{-1}$; and hydrogen/raw material oil volume ratio ranging from 50 to 500 Nm$^3$/kl.

Specific examples of the hydrocarbon oil which may be treated in the present invention include gasoline, kerosene, light gas oil, heavy gas oil, light cycle oil, atmospheric residue, vacuum residue, oil sand oil, and tar sand oil. The catalyst of the present invention is particularly effective for a hydrodesulfurization treatment involving reducing the sulfur content of a gas oil fraction to 10 ppm or less.

EXAMPLES

Hereinafter, the present invention is more specifically described by way of examples.
(Measurement Method)

Various physical properties, catalytic performance, and the like were measured according to the following procedures and conditions in addition to those as described above.
(Measurement of Pore Distribution and Pore Volume)

The pore distribution and pore volume of a catalyst or a support were each measured by a mercury intrusion method involving applying a measurement pressure of up to 414 MPa through the use of Autopore IV 9520 Type manufactured by Shimadzu Corporation.
(X-Ray Diffraction)

The X-ray diffraction of a support was measured through the use of an X-ray diffraction apparatus (apparatus name: XPERT SYSTEM/APD-1700 manufactured by PHilips) after each sample had been powderized. It should be noted that measurement conditions for the X-ray diffraction apparatus at this time were as described below.

X-ray source: Cu Kα
X-ray tube voltage (kV): 40
X-ray tube current (mA): 30
Measurement angle (°): 5 to 80
Slit width (mm): 0.2
Rec. Slit Fixed (mm): 0.2
(Gas Oil Hydrodesulfurization Test)

A gas oil hydrodesulfurization test for measuring the desulfurization activity of a hydrotreating catalyst was carried out as described below.

A high-pressure fixed-bed flow reactor was used, 15 ml of a catalyst were filled, and the test was carried out under the conditions of: reaction pressure: 5 MPa; reaction temperature: 340° C.; liquid hourly space velocity: 1.5 h$^{-1}$; and hydrogen/raw material volume ratio: 250 Nl/l. The hydrotreating catalyst was subjected to the test on gas oil which had a sulfur concentration adjusted to 2.5% (by mass) through the addition of dimethyl disulfide and which had been subjected to a sulfurization treatment in advance (preliminary sulfurization) in all cases. The properties of Middle Eastern straight-run gas oil subjected to the hydrodesulfurization test are as follows: specific gravity (15/4° C.): 0.850; sulfur content: 1.37% by mass; and nitrogen content: 101 ppm, and the distillation properties of the oil are as follows: initial boiling temperature: 232° C.; 50% distillation temperature: 295° C.; and 90% distillation temperature: 348° C.

The desulfurization activity of the hydrotreating catalyst was expressed as a "relative desulfurization activity" in the case of defining an average value of desulfurization reaction rate constants for a hydrotreating catalyst ASC-2 to be described later as 100 by determining desulfurization reaction rate constants on the assumption that a desulfurization reaction was a 1.2-order reaction, and calculating an average value of the desulfurization reaction rate constants for a reaction time of 100 to 144 hours.

(Example of Support Manufacture)
<Preparation of Raw Material Liquid>

An A liquid obtained by adding water at a ratio of 1,030 g with respect to 970 g of aluminum chloride hexahydrate, a B liquid obtained by adding water at ratio of 1,000 g with respect to 1,000 g of 28% aqueous ammonia, a C liquid obtained by adding water to 198 g of a titanium tetrachloride solution having a Ti concentration of 16.6% by mass and a Cl concentration of 32.3% by mass so that the total volume is 1.8 litters, and a D liquid obtained by adding water to 231 g of 14% aqueous ammonia so that the total volume is 1.8 litters, and an E liquid obtained by adding 733 g of hydrochloric acid and 13 g of water to 1,520 g of a titanium tetrachloride solution having a Ti concentration of 16.7% by mass and a Cl concentration of 32.6% by mass were each prepared in a total amount necessary for the operations to be described below.

<Manufacture of Alumina Supports AS-1 to AS-5>
(Preparation of Alumina Hydrate Particle)

(a) 14 litters of water were charged into a 19-litter porcelain enamel container and heated to 80° C. with stirring. 850 g of the A liquid were added to the porcelain enamel container and the mixture was kept for 5 minutes. The pH of the liquid (hereinafter, referred to as "synthesis solution") at this time was 2.5. Next, to the porcelain enamel container was added the B liquid in such an amount that the pH of the synthesis solution became 7.5 and the mixture was kept for 5 minutes (first pH swing).

(b) After that, 850 g of the A liquid were added to adjust the pH of the synthesis solution to 3.0 and the mixture was kept for 5 minutes. The B liquid was added thereto again in such an amount that the pH of the synthesis solution became 7.5 and the mixture was kept for 5 minutes (second pH swing).

(c) Then, a chlorine ion and an ammonium ion as contaminants were removed by washing to give an alumina hydrate particle AG-1 in which the pH swing number was two times.

Further, the operation (second pH swing) and the preceding operation (operations (a) and (b)) were carried out in the same manner as described above except that the addition amount of the A liquid per unit pH swing was changed to 567 g. After that, the operation (b) was repeated once again under such a condition that the addition amount of the A liquid was 567 g to give an alumina hydrate particle AG-2 in which the pH swing number was three times.

In addition, alumina hydrate particles AG-3, AG-4, and AG-5 in which the pH swing numbers are four times, five times, and six times were obtained by setting the addition amounts of the A liquid per unit pH swing to 425 g, 340 g, and 283 g, respectively.

The resultant alumina hydrate particles AG-1, AG-2, AG-3, AG-4, and AG-5 were each filtered to adjust the moisture content to one at which the particle was formable, molded into a columnar shape having a diameter of 1.2 mm by extrusion molding, then dried at 120° C. for 16 hours, and further calcined at 500° C. for 3 hours. Thus, alumina supports AS-1 to AS-5 were obtained. Each of the resultant alumina supports was measured for its specific surface area and pore distribution. Table 2 below shows the results collectively.

TABLE 2

| | Alumina support No. | | | | |
|---|---|---|---|---|---|
| | AS-1 | AS-2 | AS-3 | AS-4 | AS-5 |
| pH swing number (times) | 2 | 3 | 4 | 5 | 6 |
| Specific surface area ($m^2/g$) | 305 | 346 | 327 | 326 | 315 |
| Pore volume (ml/g) | 0.43 | 0.5 | 0.59 | 0.65 | 0.81 |
| Pore sharpness degree (%) | 70.3 | 65.9 | 79.1 | 75.6 | 76.2 |

<Manufacture of Titania-Coated Alumina Supports AT-1 to AT-5>

(Titania Coating Step)

122 g on an oxide basis of the alumina hydrate particle AG-1 were collected and stirred well with a mixer while water was added to give 8 litters of a dispersion liquid. To the dispersion liquid kept at 60° C. was added the C liquid to adjust the pH to 5.0. Subsequently, 1.8 litters each of the C liquid and the D liquid were simultaneously and continuously added over about 2 hours so as to keep the pH within a range of 5.0±0.1 to manufacture a titania-coated alumina hydrate particle. The coating amount of titania in the resultant titania-coated alumina hydrate particle is 31%.

It should be noted that, when the coating amount of titania is substituted into the above-mentioned equation (1), $$pH=6.0-0.03\times31=5.07$$

is established, and hence an optimum pH condition to be determined from the equation (1) is 5.07±0.5, which is satisfied by the pH condition of the titania coating step according to this example, i.e., 5.0±0.1.

(Washing Step to First Drying Step)

The resultant titania-coated alumina hydrate particle was washed with water to remove an ammonia ion and an chlorine ion each coexisting with the particle, filtered to adjust the moisture content to one at which the particle was formable, molded into a columnar shape having a diameter of 1.2 mm by extrusion molding (forming step), then dried at 120° C. for 16 hours, and further calcined at 500° C. for 3 hours (first drying step) to give a titania-coated alumina support AT-1.

Titania-coated alumina supports AT-2, AT-3, AT-4, and AT-5 were obtained by carrying out the coating with titanium hydroxide, forming, drying, and further calcination by the same method as in the case of the titania-coated alumina support AG-1 except that the alumina hydrate particle AG-1 used was changed to the alumina hydrate particles AG-2, AG-3, AG-4, and AG-5, respectively. Each of the resultant titania-coated alumina supports was measured for its specific surface area and pore distribution. Table 3 below shows the results collectively.

TABLE 3

| | Titania-coated alumina support No. | | | | |
|---|---|---|---|---|---|
| | AT-1 | AT-2 | AT-3 | AT-4 | AT-5 |
| Specific surface area ($m^2/g$) | 339 | 400 | 365 | 357 | 351 |
| Pore volume (ml/g) | 0.47 | 0.57 | 0.65 | 0.7 | 0.85 |
| Pore sharpness degree (%) | 72.9 | 76.5 | 80.1 | 72.1 | 73 |

As shown in Table 3, each of the titania-coated alumina supports AT-1 to AT-5 has a pore volume of 0.47 to 0.85 ml/g, which is comparable to or larger than that of the alumina support. In addition, the results reveal that the specific surface area of each of the titania-coated alumina supports AT-1 to AT-5 is approximately 340 to 400 $m^2/g$, which is larger by approximately 50 $m^2/g$ than that of the alumina support containing 100% of alumina. In addition, both the specific surface area and the pore volume are improved to a large extent as compared to the titania support TS-1 containing 100% of titania shown in Table 4.

Each of the titania-coated alumina supports AT-1 to AT-5 prepared through the operations of the first drying step and the preceding steps in the manufacturing method of the present invention was subjected to X-ray diffraction by the above-mentioned method. As a result, although the content of titania was 31% by mass on an oxide basis, no anatase crystal of titania was detected in the X-ray diffraction pattern. FIG. 1 shows an X-ray diffraction pattern of the titania-coated alumina support AT-2 as a typical example.

Figure 2:
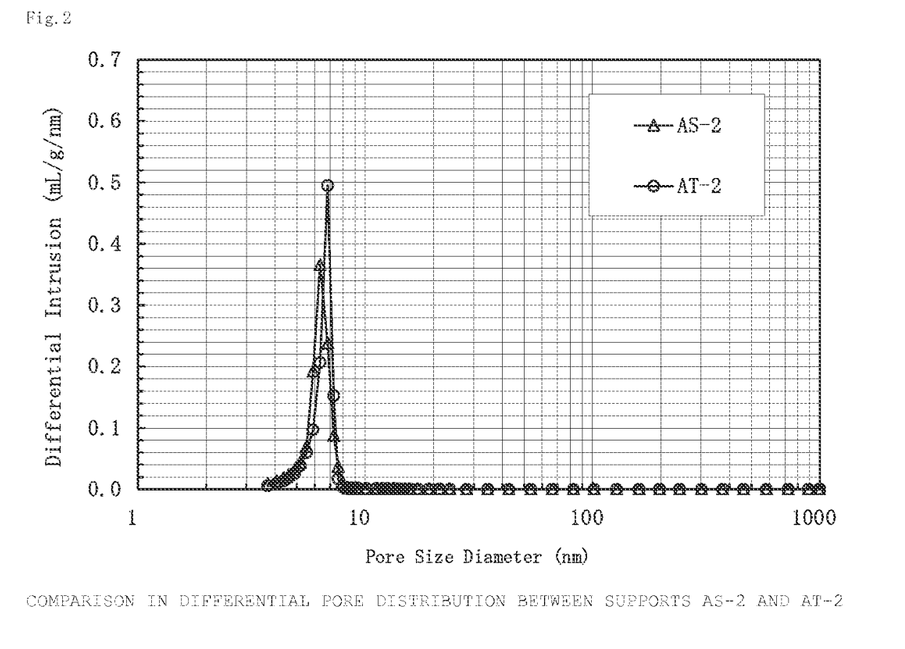
FIG. 2 A graph showing differential pore distributions of an alumina support AS-2 and a titania-coated alumina support AT-2 corresponding thereto.

Further, FIG. 2 shows differential pore volume distribution plots of the alumina support AS-2 and the titania-coated alumina support AT-2. FIG. 2 reveals that the pore distributions are substantially the same irrespective of the presence or absence of coating with 31% by mass of titania. This indicates that the alumina particle has been uniformly coated with titanium. This is also a feature of the present invention.

<Manufacture of Titania Support TS-1 for Reference>

22 litters of water were charged into a 35-litter porcelain enamel container and heated to 60° C. with stirring. 567 g of the E liquid were added to the porcelain enamel container and the mixture was kept for 5 minutes. Next, 710 g of 14% aqueous ammonia were added to the porcelain enamel container and the mixture was kept for 5 minutes (first pH swing). After that, the E liquid and aqueous ammonia were added through the same operation as in the first pH swing and the mixture was kept for 5 minutes (second pH swing). Subsequently, a chlorine ion and an ammonium ion each coexisting with the titanium hydrate particle were removed by washing to give a titania hydrate particle TG-1, which was subjected to the same operations of the forming step and the first drying step as in the titania-coated alumina support AT-2 to give a titania support TS-1. The resultant titania support TS-1 was measured for its specific surface area and pore volume. Table 4 below shows the results.

TABLE 4

| | Titania support No. TS-1 |
|---|---|
| Specific surface area ($m^2/g$) | 162 |
| Pore volume (ml/g) | 0.25 |
| Pore sharpness degree (%) | 86.4 |

<Manufacture of Titania/Alumina-Mixed Support AT-14 for Reference>

Figure 3:
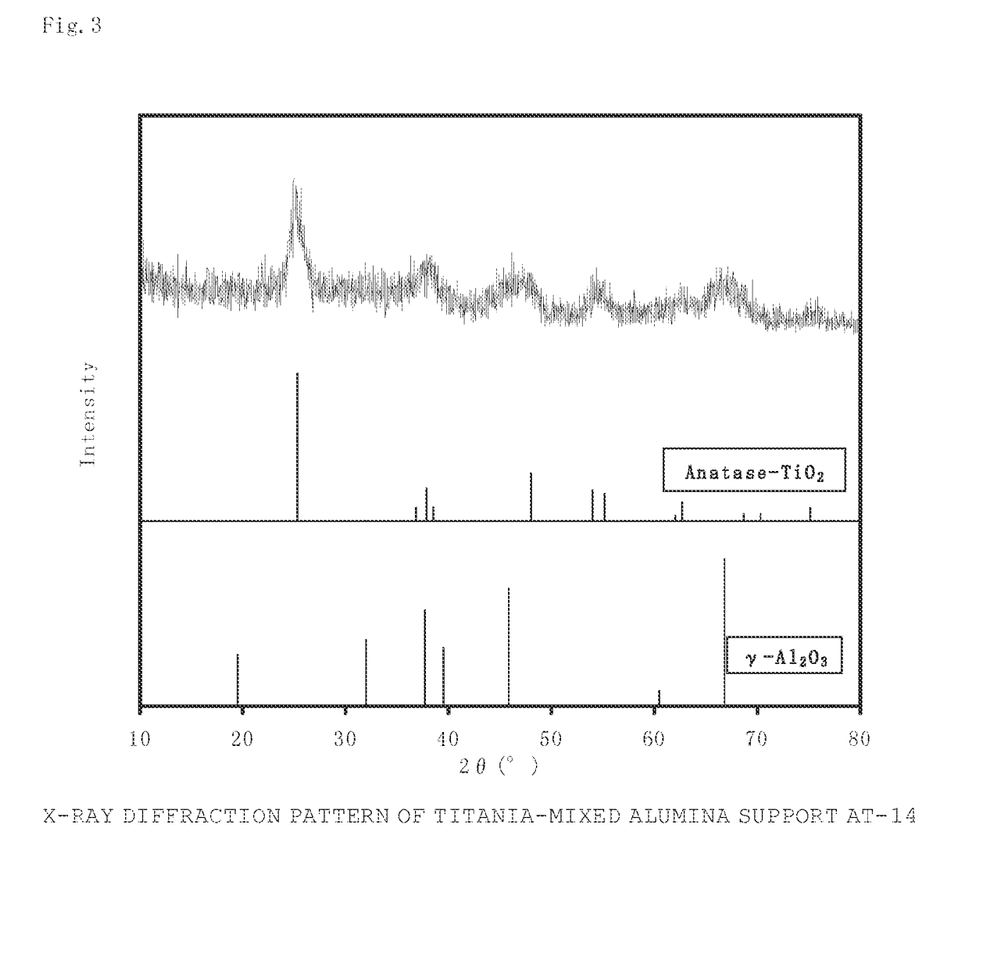
FIG. 3 A graph showing an X-ray diffraction pattern of a titania/alumina-mixed support AT-14 prepared by mixing titanium hydroxide/alumina hydrate gels.

The titania hydrate particle TG-1 and the alumina hydrate particle AG-2 were mixed with each other and subjected to moisture content adjustment and the same forming step and first drying step as in AT-2 to give a titania/alumina-mixed support AT-14 containing 31% by mass of titania and 69% by mass of alumina. The resultant titania/alumina-mixed support AT-14 was measured for its physical properties (specific surface area and pore distribution) and subjected to X-ray diffraction. Table 5 below and FIG. 3 show the measurement results of the physical properties and an X-ray diffraction pattern, respectively.

TABLE 5

|  | Titania support No. AT-14 |
| --- | --- |
| Specific surface area (m²/g) | 320 |
| Pore volume (ml/g) | 0.49 |
| Pore sharpness degree (%) | 79.8 |

<Manufacture of Titania-Coated Alumina Supports AT-6 to AT-9>

Titania-coated alumina supports AT-6 to AT-9 were each manufactured under the same conditions as in the manufacturing step of the titania-coated alumina support AT-2 except that, in the manufacturing step of the titania-coated alumina support AT-2, the pH of the titania coating step including simultaneously and continuously adding the C liquid and the B liquid to the dispersion liquid of the alumina hydrate particle was changed from "5.0±0.1" to values shown in Table 6 below. Each of the resultant titania-coated alumina supports AT-6 to AT-9 was measured for its specific surface area and pore distribution. Table 6 below shows the results.

TABLE 6

| | Titania-coated alumina support No. | | | |
| --- | --- | --- | --- | --- |
| | AT-6 | AT-7 | AT-8 | AT-9 |
| pH of titania coating step | 4.0 ± 0.1 | 6.0 ± 0.1 | 7.0 ± 0.1 | 8.0 ± 0.1 |
| Specific surface area (m²/g) | 410 | 401 | 378 | 337 |
| Pore volume (ml/g) | 0.5 | 0.56 | 0.6 | 0.46 |
| Pore sharpness degree (%) | 68.8 | 75.6 | 69.2 | 71.5 |
| Remark | For comparison | For present invention | For comparison | For comparison |

<Manufacture of Titania-Coated Alumina Supports AT-10 to AT-13>

Titania-coated alumina supports AT-10 to AT-13 were each manufactured under the same conditions as in the manufacturing step of the titania-coated alumina support AT-2 except that, in the manufacturing step of the titania-coated alumina support AT-2, the addition amounts of the B liquid and the C liquid were adjusted so that the coating amounts of titanium hydroxide were values shown in Table 7 below, and the liquids were simultaneously and continuously added. Each of the resultant titania-coated alumina supports AT-10 to AT-13 was measured for its specific surface area and pore distribution. Table 7 below shows the results. Further, FIG. 4 shows an X-ray diffraction pattern of the titania-coated alumina support AT-13 manufactured under different conditions from those of the manufacturing method of the present invention.

TABLE 7

| | Titania-coated alumina support No. | | | |
| --- | --- | --- | --- | --- |
| | AT-10 | AT-11 | AT-12 | AT-13 |
| Coating amount of titania* | 4% | 10% | 20% | 45% |
| Specific surface area (m²/g) | 358 | 380 | 404 | 349 |
| Pore volume (ml/g) | 0.52 | 0.56 | 0.57 | 0.48 |
| Pore sharpness degree (%) | 69.4 | 76.2 | 80.7 | 69.9 |

*Mass ratio of titania with respect to a total on an oxide basis of titania and an alumina support <Example of Hydrotreating Catalyst Manufacture>

(Preparation of Catalytic Component-Containing Aqueous Solution)

90.2 g of molybdenum oxide, 20.2 g of cobalt carbonate in terms of CoO, and 13.1 g of 85% phosphoric acid were added to water and dissolved by heating with stirring to give a catalytic component-containing aqueous solution MS-1 in a total amount of 500 g.

A catalytic component-containing aqueous solution MS-2 was obtained by further dissolving 3.6 g of sorbitol in 88.0 g of the catalytic component-containing aqueous solution MS-1.

Catalytic component-containing aqueous solutions MS-3 to MS-22 were each obtained in the same manner as in the catalytic component-containing aqueous solution MS-2 except that, in the preparation of the catalytic component-containing aqueous solution MS-2, respective saccharides shown Table 8 below were used in respective addition amounts shown in the table in place of 3.6 g of sorbitol.

TABLE 8

| Catalytic component aqueous solution No. | Kind of saccharide | Addition amount |
| --- | --- | --- |
| MS-1 | No addition of saccharide | 0 |
| MS-2 | Sorbitol | 3.6 |
| MS-3 | Arabinose | 3.6 |
| MS-4 | Xylose | 3.6 |
| MS-5 | Xylitol | 3.6 |
| MS-6 | Ribose | 3.6 |
| MS-7 | Fructose | 5.8 |
| MS-8 | Sorbose | 3.6 |
| MS-9 | Glucose | 5.8 |
| MS-10 | Mannose | 3.6 |
| MS-11 | Galactose | 3.6 |
| MS-12 | Mannitol | 3.6 |
| MS-13 | Dulcitol | 3.6 |
| MS-14 | Sucrose | 11.4 |
| MS-15 | Lactose | 11.4 |
| MS-16 | Maltose | 7.1 |
| MS-17 | Trehalose | 7.1 |
| MS-18 | Maltitol | 7.1 |
| MS-19 | Isomerized sugar | 7.1 |
| MS-20 | Raffinose | 7.1 |
| MS-21 | Erythritol | 3.6 |
| MS-22 | Invert sugar | 5.8 |

Comparative Examples 1 to 6

Manufacture of Hydrotreating Catalyst 50 g of the alumina support AS-2 obtained through the operations in the first drying step and the preceding steps were impregnated with 74.3 g of the catalytic component-containing aqueous solution MS-1 and further dried at 120° C. for 16 hours to give a hydrotreating catalyst ASC-2.

Hydrotreating catalysts ATC-2 and ATC-6 to ATC-9 were obtained in the same manner as in the manufacture of the hydrotreating catalyst ASC-2 except that, in the manufacture of the hydrotreating catalyst ASC-2, the titania-coated alumina supports AT-2 and AT-6 to AT-9 obtained through the operations of the first drying step and the preceding steps were used in place of the alumina support AS-2, respectively.

(Measurement of Physical Properties and Catalytic Physical Properties)

Each of the resultant hydrotreating catalysts ASC-2 and ATC-2 and ATC-6 to ATC-9 was measured for its specific surface area, pore volume, pore sharpness degree, and relative desulfurization activity (gas oil hydrodesulfurization test) by the above-mentioned method. Table 9 below shows the results.

TABLE 9

|  | Comparative Example 1 | Comparative Example 2 | Comparative Example 3 | Comparative Example 4 | Comparative Example 5 | Comparative Example 6 |
|---|---|---|---|---|---|---|
| Hydrotreating catalyst No. | ASC-2 | ATC-6 | ATC-2 | ATC-7 | ATC-8 | ATC-9 |
| Specific surface area (m$^2$/g) | 195 | 234 | 230 | 231 | 217 | 192 |
| Pore volume (ml/g) | 0.35 | 0.34 | 0.36 | 0.38 | 0.4 | 0.3 |
| Pore sharpness degree (%) | 62.4 | 58.5 | 68.4 | 64.9 | 59 | 61 |
| Relative desulfurization activity | 100 | 145 | 189 | 183 | 159 | 130 |
| Remark | Alumina | PH = 4 | PH = 5 | PH = 6 | PH = 7 | PH = 8 |

When compounds of molybdenum, cobalt, phosphorus, and the like are supported by an impregnation method in order to use the titania-coated alumina support as a hydrotreating catalyst for hydrocarbon oil, those compounds each exhibiting an desulfurization activity are supported on a titania surface exhibiting a higher hydrodesulfurization activity than an alumina surface. Thus, a hydrodesulfurization catalyst using the titania-coated alumina support can exhibit higher desulfurization activity than a catalyst using the alumina support.

In this regard, however, in the manufacturing step of the support, when the pH of an alumina slurry does not fall within the range of 4.5 to 6.5 during the addition of an acidic compound containing titania and an alkaline compound to the alumina slurry, the non-uniformity of the coating of alumina with titania increases, and hence a partially exposed portion is estimated to be generated in alumina Thus, in the hydrotreating catalysts ATC-6 (Comparative Example 2), ATC-8 (Comparative Example 5), and ATC-9 (Comparative Example 6) using the titania-coated alumina supports which do not fall within the pH range, the coating of alumina with titania in the supports is estimated to be poor, and as shown in Table 9, a decrease in desulfurization activity is observed.

Examples 1 to 5

Manufacture of Hydrotreating Catalyst 50 g each of the titania-coated alumina supports AT-10 to AT-13 and AT-2 obtained through the operations of the first drying step and the preceding steps were impregnated with 74.3 g of the catalytic component-containing aqueous solution MS-2 and further dried at 120° C. for 16 hours to give hydrotreating catalysts ATC-10 to ATC-13 and ATC-14, respectively.

(Measurement of Physical Properties and Catalytic Physical Properties)

Each of the resultant hydrotreating catalysts ATC-10 to ATC-13 and ATC-14 was measured for its specific surface area, pore volume, pore sharpness degree, compact bulk density, and relative desulfurization activity (gas oil hydrodesulfurization test) by the above-mentioned method. Table 10 below shows the results.

TABLE 10

|  | Example 1 | Example 2 | Example 3 | Example 4 | Example 5 |
|---|---|---|---|---|---|
| Hydrotreating catalyst No. | ATC-10 | ATC-11 | ATC-12 | ATC-13 | ATC-14 |
| Coating amount of titania* | 4% | 10% | 20% | 45% | 30% |
| Specific surface area (m$^2$/g) | 206 | 215 | 234 | 198 | 232 |
| Pore volume (ml/g) | 0.35 | 0.37 | 0.39 | 0.33 | 0.36 |
| Pore sharpness degree (%) | 62.1 | 67.6 | 73.2 | 62 | 70.2 |
| Relative desulfurization activity | 292 | 352 | 388 | 296 | 396 |

*Mass ratio of titania with respect to a total on an oxide basis of titania and an alumina support Examples 6 to 26

50 g of the titania-coated alumina support AT-2 was impregnated with the catalytic component-containing aqueous solutions MS-2 to MS-22 as shown in Table 11 below and dried at 120° C. for 16 hours to give hydrotreating catalysts ATC-15 to ATC-35, respectively.

Each of the resultant hydrotreating catalysts ATC-15 to ATC-35 was measured for its desulfurization activity (gas oil hydrodesulfurization test) by the above-mentioned method. Table 11 below shows the results collectively.

TABLE 11

| | Catalytic component aqueous solution No. | Hydrotreating catalyst No. | Kind of saccharide | Relative desulfurization activity |
|---|---|---|---|---|
| Example 6 | MS-2 | ATC-15 | Sorbitol | 396 |
| Example 7 | MS-3 | ATC-16 | Arabinose | 396 |
| Example 8 | MS-4 | ATC-17 | Xylose | 358 |
| Example 9 | MS-5 | ATC-18 | Xylitol | 375 |
| Example 10 | MS-6 | ATC-19 | Ribose | 393 |
| Example 11 | MS-7 | ATC-20 | Fructose | 364 |
| Example 12 | MS-8 | ATC-21 | Sorbose | 365 |
| Example 13 | MS-9 | ATC-22 | Glucose | 386 |
| Example 14 | MS-10 | ATC-23 | Mannose | 392 |
| Example 15 | MS-11 | ATC-24 | Galactose | 377 |
| Example 16 | MS-12 | ATC-25 | Mannitol | 383 |
| Example 17 | MS-13 | ATC-26 | Dulcitol | 362 |
| Example 18 | MS-14 | ATC-27 | Sucrose | 390 |
| Example 19 | MS-15 | ATC-28 | Lactose | 393 |
| Example 20 | MS-16 | ATC-29 | Maltose | 381 |
| Example 21 | MS-17 | ATC-30 | Trehalose | 376 |
| Example 22 | MS-18 | ATC-31 | Maltitol | 369 |
| Example 23 | MS-19 | ATC-32 | Isomerized sugar | 392 |
| Example 24 | MS-20 | ATC-33 | Raffinose | 378 |
| Example 25 | MS-21 | ATC-34 | Erythritol | 391 |
| Example 26 | MS-22 | ATC-35 | Invert sugar | 370 |

When the titania-coated alumina support is caused to support molybdenum, cobalt, phosphorus, or the like so as to obtain a hydrotreating catalyst, hydrotreating catalysts of Examples each additionally supporting a saccharide of sorbitol, arabinose, xylose, xylitol, ribose, fructose, sorbose, glucose, mannose, galactose, mannitol, dulcitol, sucrose, lactose, maltose, trehalose, maltitol, isomerized sugar, raffinose, erythritol, or invert sugar show extremely high desulfurization activity. It was confirmed that each of the catalysts containing those saccharides was able to improve a desulfurization activity by about 3- to 4-fold as compared to the ASC-2 catalyst free of any saccharide.

Examples 27 and 28

Catalytic component-containing aqueous solutions MS-23 and MS-24 were each obtained in the same manner as in the catalytic component-containing aqueous solution MS-2 except that, in the preparation of the catalytic component-containing aqueous solution MS-2, respective saccharides shown in Table 12 below were used in respective amounts shown in the table in place of 3.6 g of sorbitol.

TABLE 12

| | Catalytic component aqueous solution No. | Kind of saccharide | Addition amount (g) |
|---|---|---|---|
| Example 27 | MS-23 | Fructo-oligosaccharide | 3.6 |
| Example 28 | MS-24 | Nigerose | 7.1 |

Hydrotreating catalysts ATC-36 and 37 of Examples 27 and 28 were obtained in the same manner as in Example 1 except that the catalytic component-containing aqueous solutions MS-23 and 24 were used in place of the catalytic component-containing aqueous solution MS-2 in Example 1, respectively.

Each of the resultant hydrotreating catalysts ATC-36 and 37 was subjected to a gas oil hydrodesulfurization test and measured for its relative desulfurization activity by the above-mentioned method. Table 13 below shows the results.

TABLE 13

| | Hydrotreating catalyst No. | Kind of saccharide | Relative desulfurization activity |
|---|---|---|---|
| Example 27 | ATC-36 | Fructo-oligosaccharide | 242 |
| Example 28 | ATC-37 | Nigerose | 258 |

Comparative Example 7

A catalytic component-containing aqueous solution MS-25 was obtained in the same manner as in the above-mentioned catalytic component-containing aqueous solution MS-2 except that, in the preparation of the catalytic component-containing aqueous solution MS-2, 7.1 g of starch were used in place of 3.6 g of sorbitol.

In order to obtain a hydrotreating catalyst ATC-38 of Comparative Example 7, the same operation as in Example 1 was carried out except that the catalytic component-containing aqueous solution MS-25 was used in place of the catalytic component-containing aqueous solution MS-2 in Example 1. However, when the titania-coated alumina support AT-1 was impregnated with the catalytic component-containing aqueous solution MS-25, the catalytic component-containing aqueous solution did not permeate the support. Hence, it was impossible to manufacture a hydrotreating catalyst ATC-38 impregnated with the catalytic component-containing aqueous solution.

The invention claimed is:

1. A hydrotreating catalyst for hydrocarbon oil, which is manufactured by a manufacturing method for the hydrotreating catalyst, the manufacturing method comprising:
    a titania coating step including simultaneously and continuously adding an aqueous solution of an acidic compound containing titanium and an aqueous solution containing an alkaline compound to a hydrosol containing an alumina hydrate particle at a temperature ranging from 10 to 100° C. and a pH ranging from 4.5 to 6.5, and coating a surface of the alumina hydrate particle with a titanium hydroxide particle while keeping the pH constant to give a titania-coated alumina hydrate particle;
    a washing step of washing the resultant titania-coated alumina hydrate particle to remove a contaminating ion which coexists with the particle;
    a forming step of forming the washed titania-coated alumina hydrate particle after dehydrating the particle so as to have a moisture content at which the particle is formable;
    a first drying step of drying a shaped material of a titanium-coated alumina hydrate particle obtained by the forming to give a titania-coated alumina support;
    an impregnating step of impregnating the resultant titania-coated alumina support with a catalytic component-containing aqueous solution containing at least one kind of periodic table group 6 metal compound, at least one kind of periodic table group 8-10 metal compound, and at least one kind of phosphorus compound as catalytic components, and a saccharide; and
    a second drying step of drying the titania-coated alumina support impregnated with the catalytic component-containing aqueous solution, wherein
    a crystal system of the alumina hydrate particle in the hydrosol comprises at least one selected from the group consisting of boehmite, pseudoboehmite, and an alumina gel;

a repetition length of a crystal lattice plane of titania in the titania-coated alumina support is 50 Å or less; and a pore sharpness degree of the titania-coated alumina support is 60% or more.

2. The hydrotreating catalyst for hydrocarbon oil according to claim 1, wherein the catalyst has supported thereon a periodic table group 6 metal compound, a periodic table group 8-10 metal compound, a phosphorus compound, and a saccharide.

3. The hydrotreating catalyst for hydrocarbon oil according to claim 1, wherein a pore volume of the titania-coated alumina support is 0.36 to 1.10 ml/g.

4. The hydrotreating catalyst for hydrocarbon oil according to claim 1, wherein a specific surface area of the titania-coated alumina support is 200 m2/g or more.

5. The hydrotreating catalyst for hydrocarbon oil according to claim 1, wherein a compact bulk density (CBD) of the catalyst is 0.5 to 1.1 g/ml.

* * * * *